United States Patent
Rogers et al.

(10) Patent No.: US 10,972,261 B1
(45) Date of Patent: Apr. 6, 2021

(54) SECURE DATA PROCESSING

(71) Applicant: Via Science, Inc., Somerville, MA (US)

(72) Inventors: Mathew Donald Rogers, Montreal (CA); Kai Chung Cheung, Markham (CA); Jeremy Taylor, Quebec (CA)

(73) Assignee: Via Science, Inc., Somerville, MA (US)

( * ) Notice: Subject to any disclaimer, the term of this patent is extended or adjusted under 35 U.S.C. 154(b) by 0 days.

(21) Appl. No.: 17/020,179

(22) Filed: Sep. 14, 2020

Related U.S. Application Data

(60) Provisional application No. 62/916,822, filed on Oct. 18, 2019.

(51) Int. Cl.
| | |
|---|---|
| *G06F 21/00* | (2013.01) |
| *H04L 29/06* | (2006.01) |
| *H04L 9/08* | (2006.01) |
| *G06N 5/00* | (2006.01) |
| *H04L 9/00* | (2006.01) |

(52) U.S. Cl.
CPC ............ *H04L 9/085* (2013.01); *G06N 5/003* (2013.01); *H04L 9/008* (2013.01); *H04L 9/0822* (2013.01); *H04L 9/0825* (2013.01)

(58) Field of Classification Search
CPC ....... H04L 9/085; H04L 9/0825; H04L 9/008; H04L 9/0822; G06N 5/003
See application file for complete search history.

(56) References Cited

U.S. PATENT DOCUMENTS

| | | | | |
|---|---|---|---|---|
| 5,539,638 A * | 7/1996 | Keeler | ............... | G05B 13/048 |
| | | | | 701/32.9 |
| 5,941,918 A * | 8/1999 | Blosser | ............... | F01N 13/008 |
| | | | | 701/31.7 |
| 6,078,667 A * | 6/2000 | Johnson | ............... | G06F 7/582 |
| | | | | 380/44 |
| 6,148,342 A * | 11/2000 | Ho | ............... | G06F 21/6245 |
| | | | | 709/223 |
| 6,839,338 B1 * | 1/2005 | Amara | ............... | H04L 63/0227 |
| | | | | 370/338 |
| 8,666,841 B1 * | 3/2014 | Claridge | ............... | G06Q 30/00 |
| | | | | 705/26.35 |
| 9,472,084 B1 * | 10/2016 | Barak | ............... | G08B 21/187 |
| 2004/0088406 A1 * | 5/2004 | Corley | ............... | H04L 41/064 |
| | | | | 709/224 |
| 2006/0015945 A1 * | 1/2006 | Fields | ............... | H04L 67/2823 |
| | | | | 726/27 |
| 2007/0282545 A1 * | 12/2007 | Board | ............... | G01H 1/00 |
| | | | | 702/56 |
| 2009/0030861 A1 * | 1/2009 | Almond | ............... | G06N 7/005 |
| | | | | 706/21 |
| 2013/0080573 A1 * | 3/2013 | Boliek | ............... | H04L 63/08 |
| | | | | 709/217 |
| 2018/0336463 A1 * | 11/2018 | Bloom | ............... | G06N 3/08 |

(Continued)

*Primary Examiner* — Lisa C Lewis
(74) *Attorney, Agent, or Firm* — Pierce Atwood LLP

(57) ABSTRACT

Multiple data sources encrypt data using encryption key data received from a first system; a second system does not have access to the encryption key data. The second system receives the encrypted data from the multiple data sources. Because the encryption is additively homomorphic, the second system may create encrypted summation data using the encrypted data. The second system may send the encrypted summation data to the first system, which may then decrypt the encrypted summation data to create unencrypted summation data.

20 Claims, 12 Drawing Sheets

(56) References Cited

U.S. PATENT DOCUMENTS

| | | | |
|---|---|---|---|
| 2019/0171950 A1* | 6/2019 | Srivastava | G06Q 10/067 |
| 2019/0227096 A1* | 7/2019 | Chowdhary | H04M 1/72569 |
| 2019/0311298 A1* | 10/2019 | Kopp | G06K 9/6256 |
| 2020/0244435 A1* | 7/2020 | Shpurov | H04L 63/0428 |
| 2020/0273570 A1* | 8/2020 | Subramanian | G06N 20/00 |
| 2020/0311273 A1* | 10/2020 | Knox | G06N 5/02 |
| 2020/0334524 A1* | 10/2020 | Sprague | G06N 3/088 |

* cited by examiner

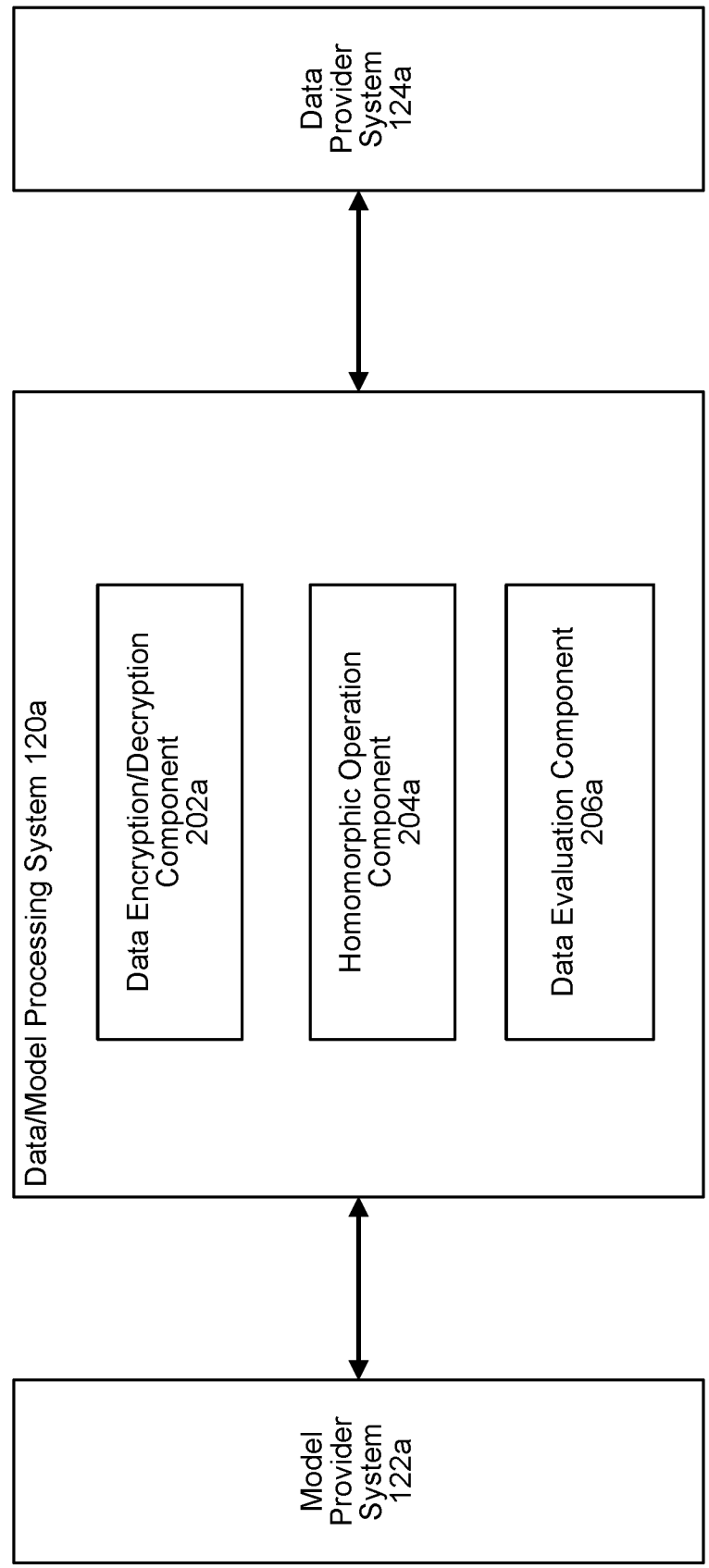

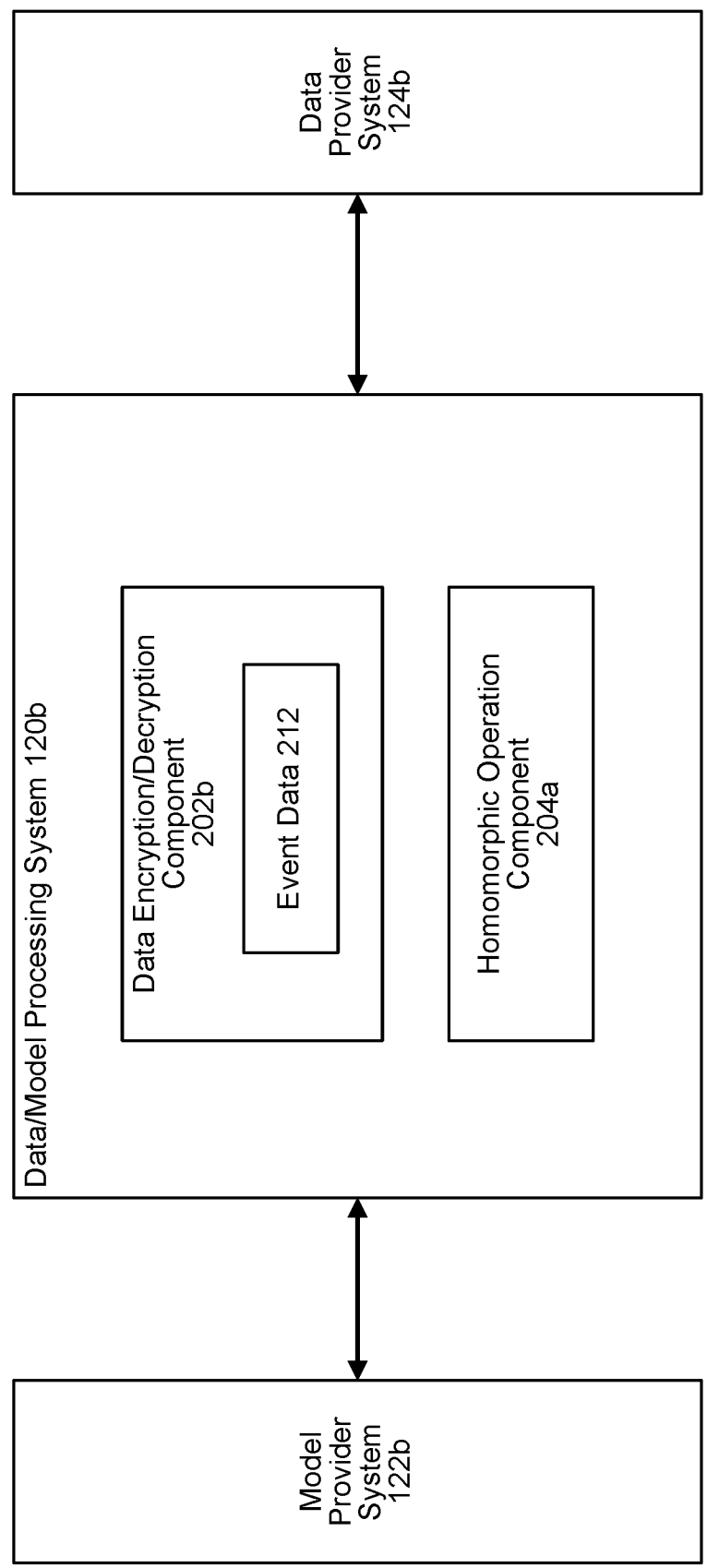

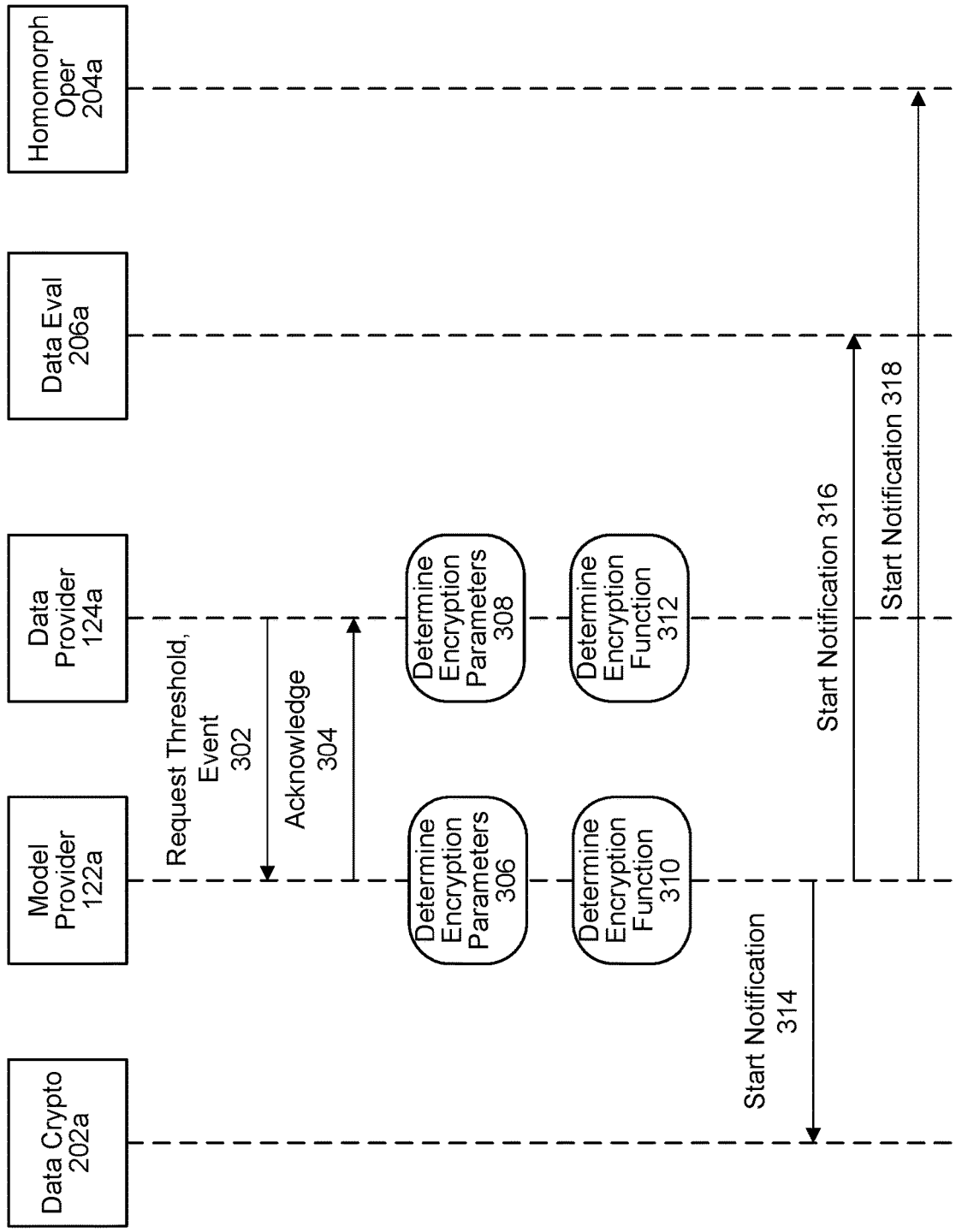

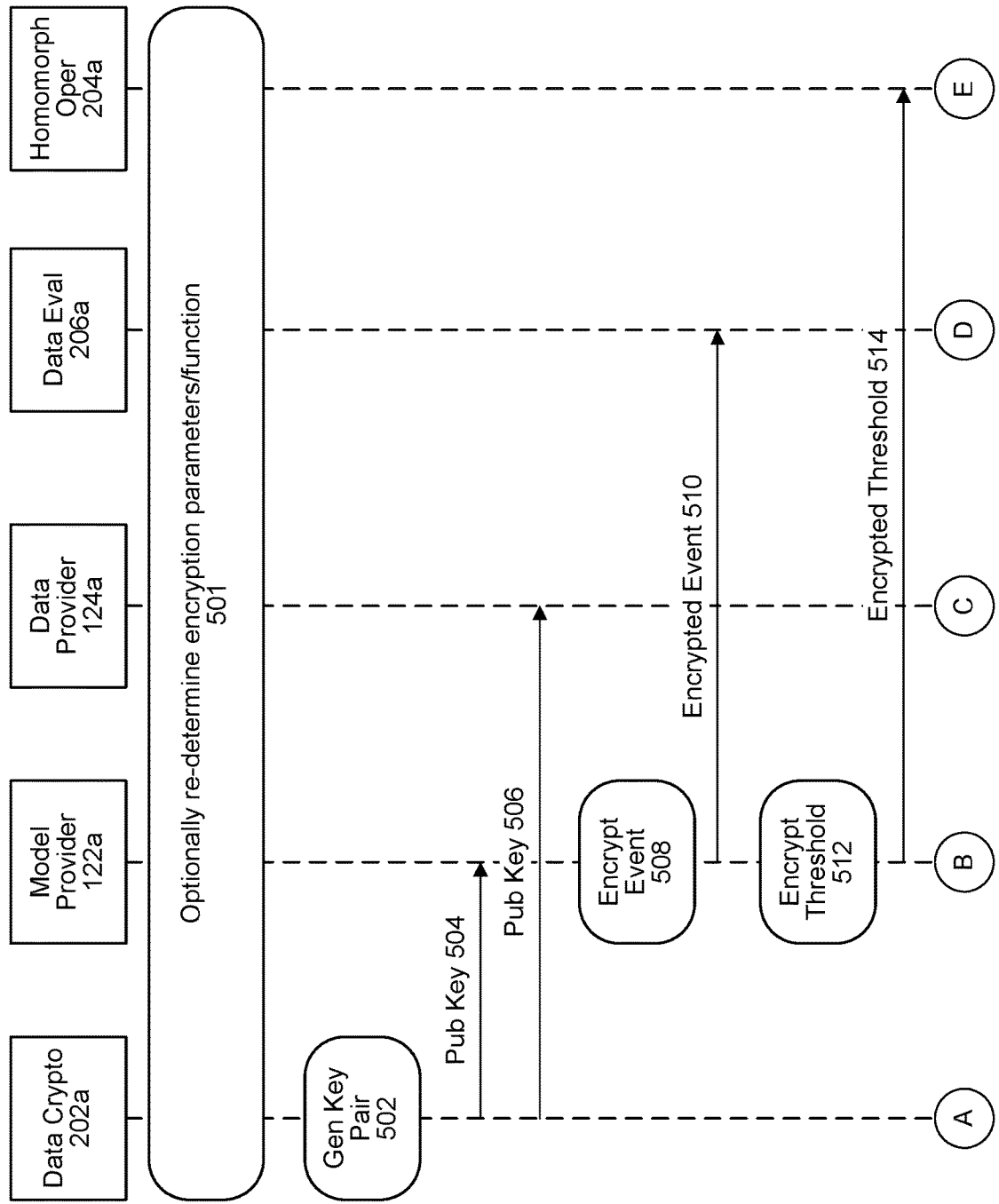

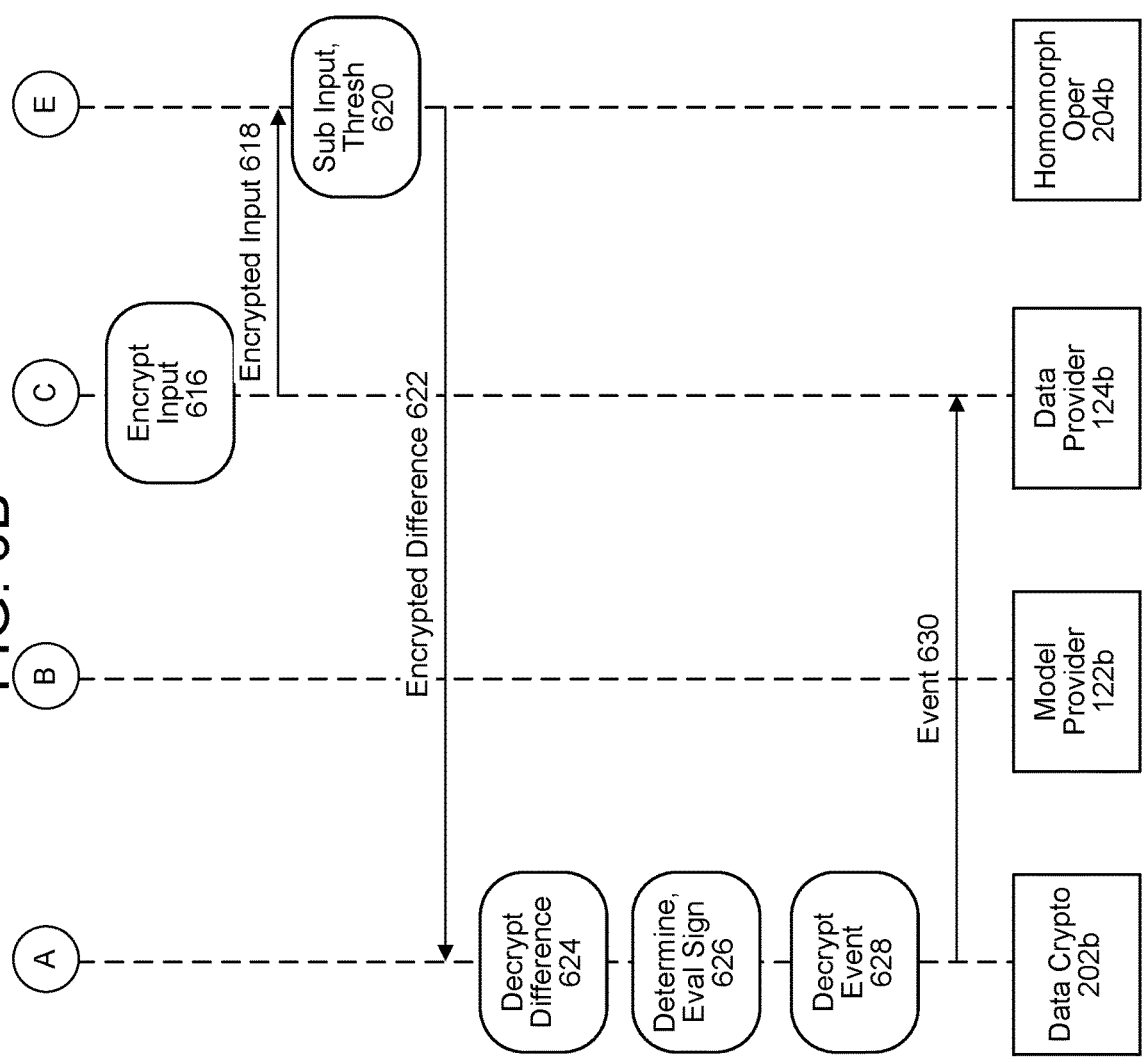

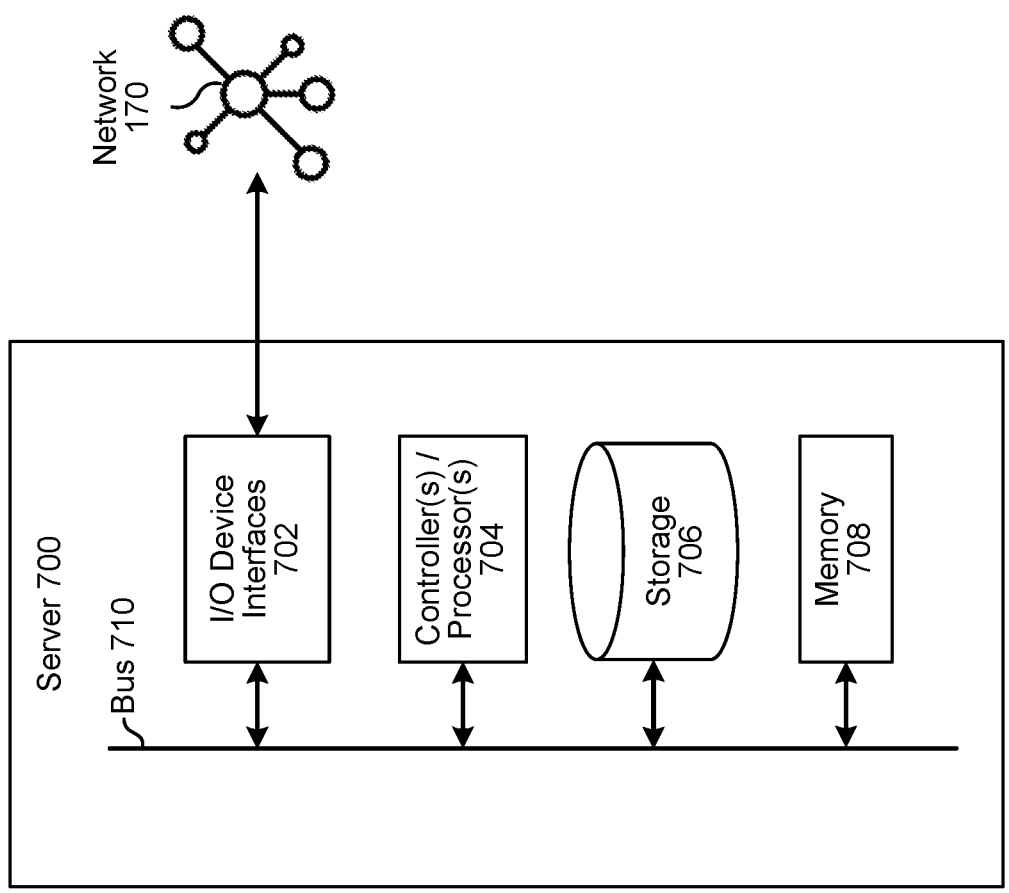

SECURE DATA PROCESSING

CROSS-REFERENCE TO RELATED APPLICATION DATA

This application claims the benefit of and priority to U.S. Provisional Patent Application No. 62/916,822, filed Oct. 18, 2019, and entitled "TAC Comparison Oracle," in the names of Mathew Donald Rogers, et al. The above provisional application is herein incorporated by reference in its entirety.

BACKGROUND

Data security and encryption is a branch of computer science that relates to protecting information from disclosure to third parties and allowing only an intended party or parties access to that information. The data may be encrypted using various techniques, such as public/private key cryptography, and may be decrypted by the intended recipient using a shared public key and a private key. Transmission of the data is protected from being decrypted by third parties at least by their lack of possession of the private key.

BRIEF DESCRIPTION OF DRAWINGS

For a more complete understanding of the present disclosure, reference is now made to the following description taken in conjunction with the accompanying drawings.

FIGS. 2A and 2B illustrate computing environments including a data/model processing system according to embodiments of the present disclosure.

FIGS. 3 and 4 illustrate processes for initializing a data/model processing system according to embodiments of the present disclosure.

FIGS. 5A, 5B, 6A, and 6B illustrate processes for operating a data/model processing system according to embodiments of the present disclosure.

FIG. 7 is a conceptual diagram of components of a system according to embodiments of the present disclosure.

SUMMARY

Figure 1A:
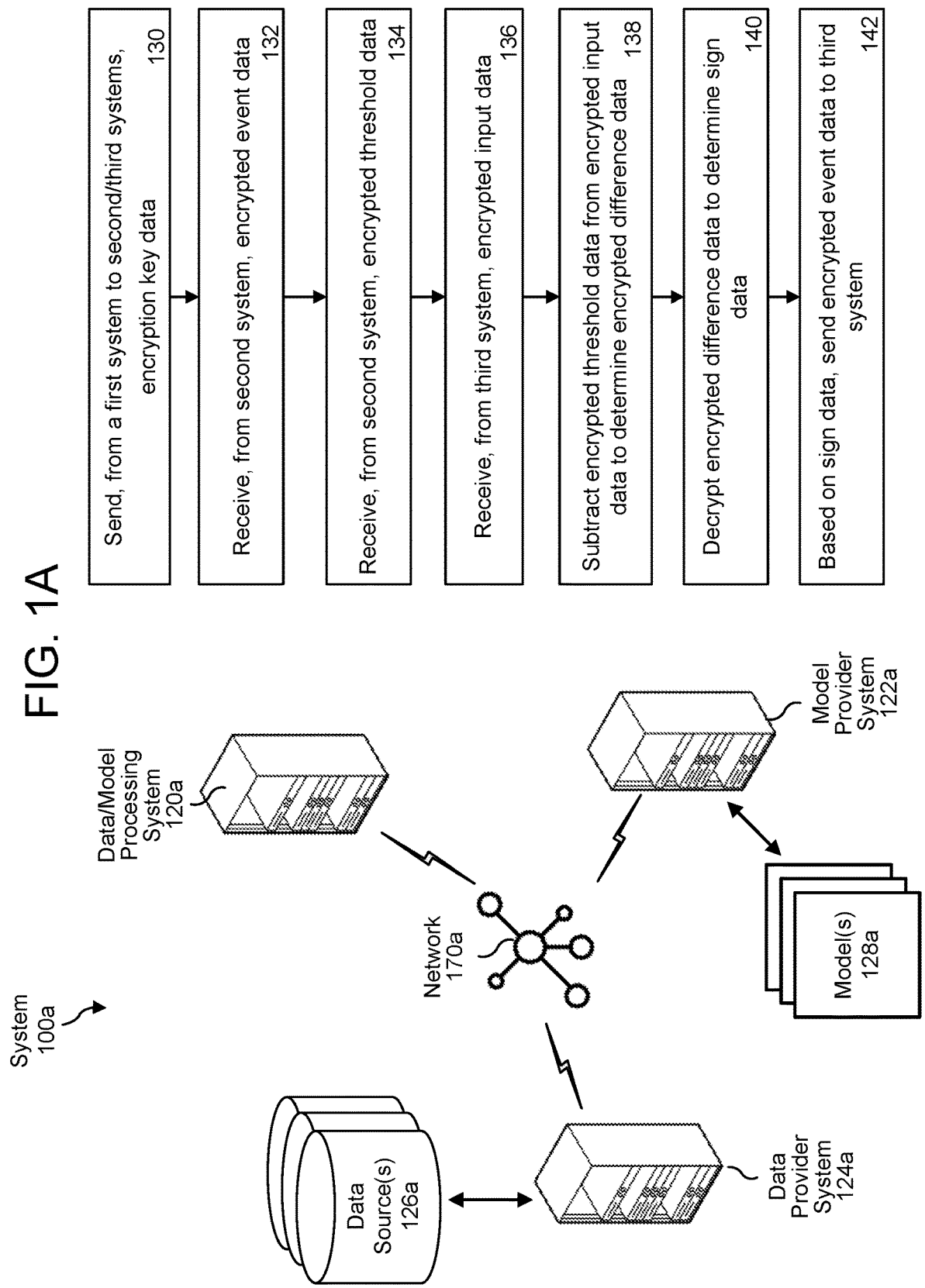
FIGS. 1A and 1B illustrate systems configured to securely process data according to embodiments of the present disclosure.

In various embodiments of the present disclosure, a first system communicates with a second system that includes a predictive model and a third system that includes input data. The third system permits the second system to process data corresponding to the input data to predict an event. The input data may include operational data corresponding to a component, such as voltage, current, temperature, and/or vibration data. Prediction of the event may include comparing one or more items of input data to threshold data; the item of input data being greater than a corresponding item of threshold data may indicate future occurrence of the event, such as failure of the component. The first system may receive encrypted threshold data from the second system and encrypted input data from the third system. The first system may perform one or more operations on the encrypted threshold data and the encrypted input data to determine whether the item of input data meets or exceeds the corresponding threshold data. If so, the first system may send an indication of the event to the third system.

DETAILED DESCRIPTION

Machine-learning systems, such as those that use neural networks, may be trained using training data and then used to make predictions of events using out-of-sample (i.e., non-training) data. A system providing this data, referred to herein as a data-provider system, may acquire this data from one or more data sources. The data-provider system may be, for example, a power company, and may collect data regarding operational status of a data source such as a particular component (e.g., a transformer); this data may include, for example, temperature, vibration, and/or voltage data collected during use of the component. The data-provider system may then annotate this data to indicate times at which the component failed. Using this collected and annotated data, the data-provider system may train a neural network to predict when the same or similar component will next fail based on the already-known times of past failure. Once trained, the data-provider system may deploy the model to attempt to receive additional data collected from the component and make failure predictions for currently operating components using this out-of-sample data.

The data-provider system may, however, have access to insufficient training data, training resources, or other resources required to train a model that is able to predict a given event (e.g., failure of the component) with sufficient accuracy. The data-provider system may thus communicate with another system, a model-provider system, that includes such a model. The data-provider system may thus send data regarding the data source(s) to the model-provider system, and the model-provider system may evaluate the model using the data to predict the event. The model of the model-provider system may be trained using data provided by the data-provider system, other data-provider system(s), and/or other sources of data.

The data-provider system may, however, wish to keep the data from the one or more data sources private and, in particular, may not wish to share said data with the model-provider system. The model-provider system may similarly wish to keep the model (and/or one or more trained parameters and/or results thereof, such as threshold data) secret with respect to the data-provider system (and/or other systems).

Embodiments of the present disclosure thus recite secure evaluation of one or more models (which may be the machine-learning model(s) described above, or other models, such as decision trees) using the data such that the data-provider system does not have direct access to the model (and/or results thereof) and such that the model-provider system does not have direct access to the data. A data/model processing system may thus receive encrypted input data from the data-provider system and encrypted threshold data from the model-provider system; the data/model processing system may determine whether an event is predicted to occur by comparing the encrypted input data with the encrypted threshold data.

As the terms are used herein, the data/model processing system may be referred to as a "first system"; the model-provider system may be referred to as a "second system"; and the data-provider system may be referred to as a "third system." Any number of systems and any names of said systems are, however, within the scope of the present disclosure.

Figure 1B:
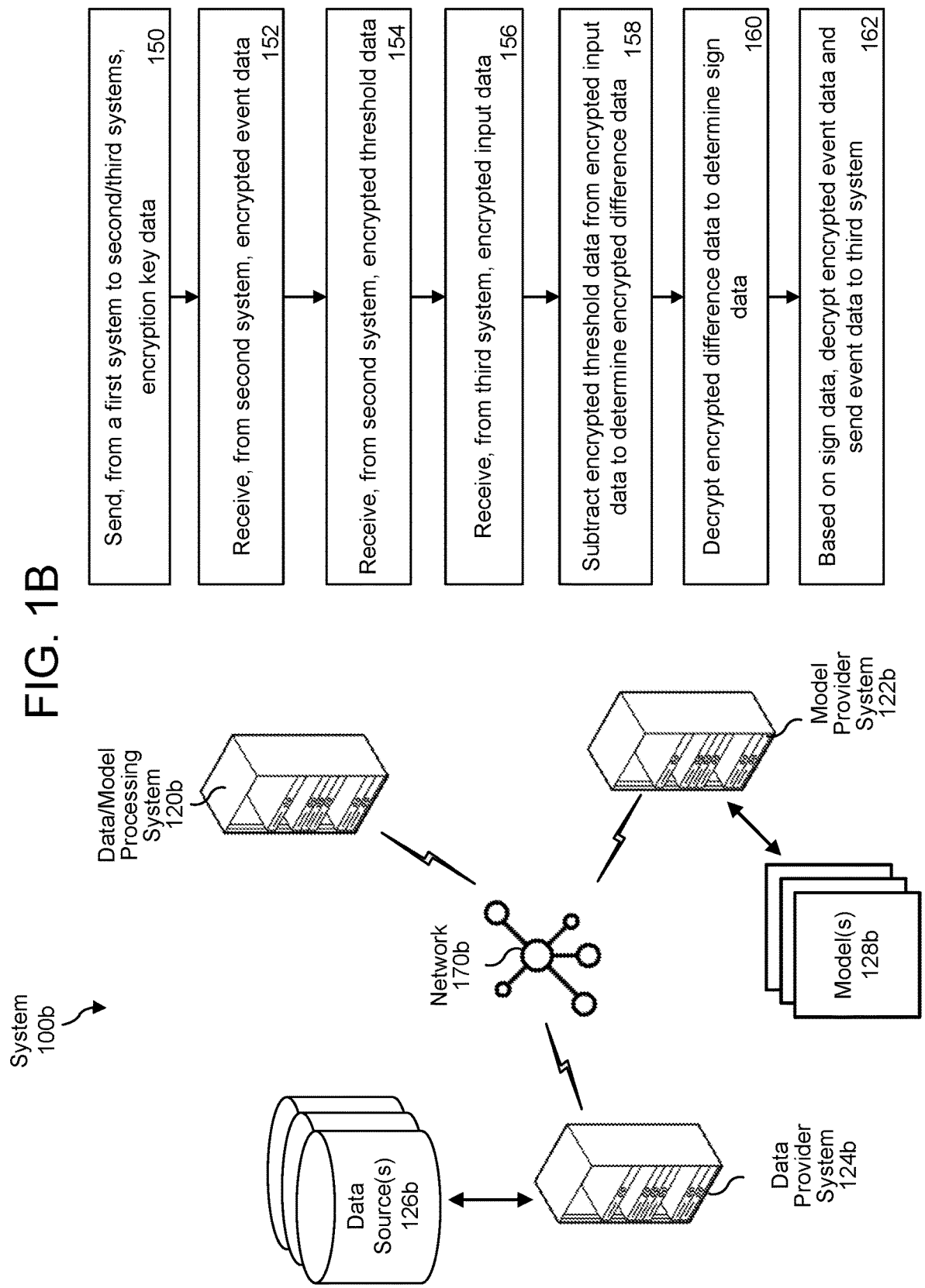

FIGS. 1A and 1B show systems that include a data/model processing system 120a/120b (a "first system," which may be referred to collectively as the data/model processing system 120), a model-provider system 122a/122b (a "second system," which may be referred to collectively as the model-provider system 122), a data-provider system 124a/124b (a "third system," which may be referred to collectively as the data-provider system 124), and a network 170a/170b. The data/model processing system 120a/120b, the model-provider system 122a/122b, and/or the data-provider system 124a/124b may be one or more servers 700, as illustrated in FIG. 7. The network 170 may include the Internet and/or any other wide- or local-area network, and may include wired, wireless, and/or cellular network hardware. The data/model processing system processor 120a/120b may communicate, via the network 170a/170b, with one or more model-provider system(s) 122a/122b, and one or more data-provider system(s) 124a/124b. The data/model processing system 120a/120b may transmit, via the network 170a/170b, requests to the other systems using one or more application programming interfaces (APIs). Each API may correspond to a particular application. A particular application may, for example, be operated within the data/model processing system 120a/120b or may be operating using one or more of the other systems.

Referring first to FIG. 1A, in accordance with the present disclosure, a system 100a includes a data/model processing system 120a, a model-provider system 122a, and a data-provider system 124a. The systems 120a, 122a, 124a may initialize one or more values or other data as explained in greater detail below with respect to FIGS. 3 and 4.

The data/model processing system 120a sends (130), to the model-provider system 122a and the data-provider system 124a, encryption key data. As explained in greater detail below, the data/model processing system 120a may determine a public/private key pair $\kappa^+/\kappa^-$, wherein the public key $\kappa^+$ and the private key $\kappa^-$ are each large (e.g. 1024-bit) prime numbers. The encryption key data that the data/model processing system 120a sends to the model-provider system 122a and the data-provider system 124a may include the public key $\kappa^+$. The data/model processing system 120a may retain both the public key $\kappa^+$ and the private key $\kappa^-$ for future use. The public key $\kappa^+$ and the private key $\kappa^-$ may be large numbers, such as 1024-bit, 2048-bit, or 4096-bit numbers. In some embodiments, when using elliptic curve cryptography, the private key is $\kappa^-$ a large random number $n_B$ and the public key $\kappa^+$ is a group generator of the corresponding curve, G, and may be a multiple of the private key $\kappa^-(G \times n_B)$.

As explained in greater detail below, the model-provider system 122a may determine an event associated with the data-provider system 124a. This event may be a prediction determined based at least in part on data from one or more data source(s) 126a in communication with the data-provider system 124a. The data may be, for example, operational data obtained from a component of the data-provider system 124a, and the event may be the predicted failure of the component. Event data corresponding to the event may include an indication or other such description of the event. The model-provider system 122a may encrypt the event data using the public key $\kappa^+$ to determine encrypted event data. The data/model processing system 120a may receive (132), from the model-provider system 122a, the encrypted event data.

The model-provider system 122a may further determine threshold data $X_C$ corresponding to the event. As explained in greater detail below, the threshold data $X_C$ may be a floating-point number that is compared to a corresponding item of input data X; the condition $X > X_C$ evaluating to "true" may predict occurrence of the event. As also explained in greater detail below, the model-provider system 122a may determine the threshold data $X_C$ through experimentation; e.g., by determining which input or inputs to a trained model 128 change to trigger the model 128 to predict occurrence of the event. The model-provider system 122a may similarly encrypt the threshold data using the public key $\kappa^+$ to determine encrypted threshold data. Prior to encryption, again as described in greater detail below, the model-provider system 122a may modify the threshold data $X_C$ using one or more encryption parameters (such as values R and P) and/or one or more encryption functions $f(x)$. The data/model processing system 120a may then receive (134), from the model-provider system 122a, the encrypted threshold data.

The data-provider system 124a may determine input data X corresponding to one or more items of data in the data source(s) 126a. The input data X may correspond to the threshold data $X_C$; that is, the input data X may represent a voltage, current, temperature, vibration amount, etc., and the threshold data $X_C$ may represent a corresponding threshold amount of the voltage, current, temperature, vibration amount, etc. The input data X being equal to or greater than the threshold data $X_C$ may imply that the event is predicted to occur. The data-provider system 124a may similarly encrypt the input data using the public key $\kappa^+$ to determine encrypted input data. The data-provider system 124a may send, and the data/model processing system 120a may receive, (136) the encrypted input data. The data provider system 124a may similarly, prior to encryption, modify the input data X using the one or more encryption parameters (such as values R and P) and/or the one or more encryption functions $f(x)$.

The data/model processing system 120a may then subtract (138) the encrypted threshold data from the encrypted input data to determine encrypted difference data. As explained herein, the encrypted input data and/or the encrypted threshold data may be homomorphic encryption data and may be processed in accordance with the below equations to determine the encrypted difference data. The homomorphic encryption data may be determined using any additive homomorphic operation such that performing an operation using the encrypted data yields an encrypted result that corresponds to adding and/or subtracting the underlying encrypted data. Examples of additive homomorphic encryption operations include RSA encryption, elliptic-curve cryptography, and/or encryption based on the Simple Encrypted Arithmetic Library ("SEAL"). An example SEAL operation is Brakerski/Fan-Vercauteren (BEV) homomorphic encryption.

For example, an RSA encryption function H(m) may be defined as shown below in equation (1), in which a and n are values configured for a specific encryption function.

$$H(m) = a^{me} \pmod{n} \qquad (1)$$

A corresponding decryption function $H^{-1}(c)$ may be used to decrypt data encrypted in accordance with the encryption function of equation (1). In some embodiments, the decryption function $H^{-1}(c)$ is defined using the below equation (2), in which log, is the discrete logarithm function over base a. The algorithm function $\log_a$ may be computed by using, for example, a "baby-step giant-step" algorithm.

$$H^{-1} = \log_a(c^d) \pmod{n} \qquad (2)$$

In various embodiments, data encrypted using the encryption function $H(m)$ is additively homomorphic such that $H(m_1+m_2)$ may be determined in accordance with the below equations (3) and (4).

$$H(m_1+m_2)=a^{(m1+m2)e}(\text{mod } n) \quad (3)$$

$$H(m_1+m_2)=a^{m1e}a^{m2e}(\text{mod } n) \quad (4)$$

In some embodiments, the above equations (3) and (4) may be computed or approximated by multiplying $H(m1)$ and $H(m2)$ in accordance with the below equation (5) and in accordance with the homomorphic encryption techniques described herein.

$$H(m_1+m_2)=H(m_1)H(m_2) \quad (5)$$

Similarly, the difference between $H(m1)$ and $H(m2)$ may be determined by transforming $H(m1)$ and $H(m2)$ into its negative value in accordance with equation (6).

$$H(m_1-m_2)=H(m_1)\times(-1)H(m_2) \quad (6)$$

The result of Equation (6) may be the encrypted difference data described above.

Homomorphic encryption using elliptic-curve cryptography utilizes an elliptic curve to encrypt data, as opposed to multiplying two prime numbers to create a modulus, as described above. An elliptic curve E is a plane curve over a finite field $F_p$ of prime numbers that satisfies the below equation (7).

$$y^2=x^3+ax+b \quad (7)$$

The finite field $F_p$ of prime numbers may be, for example, the NIST P-521 field defined by the U.S. National Institute of Standards and Technology (NIST). In some embodiments, elliptic curves over binary fields, such as NIST curve B-571, may be used as the finite field $F_p$ of prime numbers. A key is represented as (x,y) coordinates of a point on the curve; an operator may be defined such that using the operator on two (x,y) coordinates on the curve yields a third (x,y) coordinate also on the curve. Thus, key transfer may be performed by transmitting only one coordinate and identifying information of the second coordinate.

The above elliptic curve may have a generator point, G, that is a point on the curve—e.g., $G=(x,y)\in E$. A number n of points on the curve may have the same order as G—e.g., $n=o(G)$. The identity element of the curve E may be infinity. A cofactor h of the curve E may be defined by the following equation (8).

$$h = \frac{|E(F_p)|}{o(G)} \quad (8)$$

A first party, such as the data/model processing system 120, model provider system 122, and/or model provider system 122, may select a private key $n_B$ that is less than $o(G)$. In various embodiments, at least one other of the data/model processing system 120, model provider system 122, and/or model provider system 122 is not the first party and thus does not know the private key $n_B$. The first party may generate a public key $P_B$ in accordance with equation (9).

$$P_B = n_B G = \sum_{i}^{n_B} G \quad (9)$$

The first party may then transmit the public key $P_B$ to a second party, such as one or more of the data/model processing system 120, model provider system 122, and/or model provider system 122. The first party may similarly transmit encryption key data corresponding to domain parameters (p, a, b, G, n, h). The second party may then encrypt data m using the public key $P_B$. The second party may first encode the data m; if m is greater than zero, the second party may encode it in accordance with mG; m is less than zero, the second party may encode it in accordance with $(-m)G^{-1}$. If $G=(x,y)$, $G^{-1}=(x,-y)$. In the below equations, however, the encoded data is represented as mG for clarity. The second party may perform the encoding using, for example, a doubling-and-adding method, in $O(\log(m))$ time.

To encrypt the encoded data mG, the second party may select a random number c, wherein c is greater than zero and less than a finite field prime number p. The second party may thereafter determine and send encrypted data in accordance with the below equation (10).

$$H(m)=\{cG, mG+CP_B\} \quad (10)$$

A corresponding decryption function $H^{-1}(m)$ may be used to decrypt data encrypted in accordance with the encryption function of equation (1). The decrypted value of $H(m)$ is m, regardless of the choice of large random number c. The first party may receive the encrypted data from the second party and may first determine a product of the random number c and the public key $P_B$ in accordance with equation (11).

$$CP_B=c(n_B G)=n_B(cG) \quad (11)$$

The first party may then determine a product of the data m and the generator point G in accordance with the below equation (12).

$$mG=(mG+cP_B)-n_B(cG) \quad (12)$$

Finally, the first party may decode mG to determine the data m. This decoding, which may be referred to as solving the elliptic curve discrete logarithm, may be performed using, for example, a baby-step-giant-step algorithm in $O(\sqrt{m})$ time.

In various embodiments, data encrypted using the encryption function $H(m)$ is additively homomorphic. That is, the value of $H(m_1+m_2)$ may be expressed as shown below in equation (13).

$$H(m_1+m_2)=\{cG,(m_1+m_2)G+CP_B\} \quad (13)$$

The value of $H(m1)+H(m2)$ may be expressed as shown below in equations (14) and (15).

$$H(m_1) + H(m_2) = \{c_1 G, m_1 G + c_1 P_B\} + \{c_2 G, m_2 G + c_2 P_B\} \quad (14)$$

$$H(m_1) + H(m_2) = \{(c_1 + c_2)G, (m_1 + m_2)G + (c_1 + c_2)P_B\} \quad (15)$$

Therefore, $H(m_1+m_2)=H(m_1)+H(m_2)$. Similarly, if m is negative, $H(m)$ may be expressed in accordance with equation (16).

$$H(m)=\{cG,(-m)G^{-1}+cP_B\} \quad (16)$$

$H(m_1)-H(m_2)$ may thus be expressed as below in accordance with equation (17).

$$H(m_1) - H(m_2) = H(m_1) + H(-m_2) \quad (17)$$
$$= \{(c_1 + c_2)G, (m_1 - m_2)G + (c_1 + c_2)P_B\}$$
$$= H(m_1 - m_2)$$

The data/model processing system 120a may determine (140) sign data corresponding to the encrypted difference data; i.e., the data/model processing system may compare the encrypted threshold data to the encrypted input data to determine which is greater; if the encrypted difference data is greater than zero (i.e., its sign is positive), that may imply that the encrypted input data is greater than the encrypted threshold data (and, therefore, that the event is predicted to occur). If, on the other hand, the encrypted difference data is less than zero (i.e., its sign is negative), that may imply that the encrypted input data is less than the encrypted threshold data (i.e., its sign is positive) and that the event is not predicted to occur. In other embodiments, the encrypted input data is subtracted from the encrypted threshold data; in these embodiments, a positive sign implies that the event is not predicted to occur, and vice versa. The present disclosure is not limited to any particular order of operations of the subtraction operation. In some embodiments, the sign of either the encrypted threshold data or the encrypted input data is flipped prior to the operation (i.e., either the encrypted threshold data or the encrypted input data is multiplied by −1; in these embodiments, the operands are then added together. The sign data may be, for example, a first value (e.g., "1") to represent a positive sign and a second value (e.g., "0") to represent a negative sign.

The data/model processing system 120a may then, based on the sign data, send (142) encrypted event data to the data-provider system 124a. If, for example, the sign data indicates that the value of the input data is greater than the value of the threshold data, the data/model processing system 120a may send the encrypted event data; if the sign data indicates that the value of the input data is less than the value of the sign data, the data/model processing system 120a may not send the encrypted event data. Upon receipt of the encrypted event data, the data-provider system 124a may decrypt the encrypted event data (using, e.g., the public and/or private key $\kappa^+/\kappa^-$) to determine the event data.

FIG. 1B illustrates embodiments of the present disclosure in which the data/model processing system 120b is trusted to decrypt the event data and then send the event data to the data-provider system 124b. For example, with reference also to FIG. 1A, the data/model processing system 120b may send (150), to the model-provider system 122b and to the data-provider system 124b, encryption key data which may include the public key $\kappa^+$. The data/model processing system 120b may similarly receive (152), from the model-provider system 122b, encrypted event data; may receive (154), from the model-provider system 122b, encrypted threshold data; and may receive (156), from the data-provider system 124b, encrypted input data. The data/model processing system 120b may subtract (158) (e.g., using Equation (6)) the encrypted threshold data from the encrypted input data to determine encrypted difference data and may similarly decrypt (160) the encrypted difference data to determine sign data.

In the embodiments illustrated in FIG. 1B, the data/model processing system 120b may further, based on the sign data, decrypt (162) the encrypted event data and may then send the event data (in addition to and/or in lieu of the encrypted event data) to the data-provider system 124b. For example, the data-provider system 124b may trust the data/model processing system 120b to possess the event data and/or may not have the resources to decrypt the event data.

FIGS. 2A and 2B illustrate computing environments including a data/model processing system 120a/120b according to embodiments of the present disclosure. The data/model processing system 120a/120b may be one or more servers 700 configured to send and/or receive encrypted and/or other data from one or more model-provider system(s) 122a/122b and/or one or more data-provider system(s) 124a/124b. The model-provider system 122a/122b may include and/or train a first model, such as a neural-network machine-learning model, configured to process data from the one or more data-provider system(s) 124a/124b. The model-provider system 122a/122b may further include a second model, such as a decision tree, configured to evaluate further data from the one or data-provider system(s) 124a/124b to determine whether the data indicates occurrence of the one or more events. In some embodiments, the model-provider system 122a/122b provides threshold data to be compared against input data provided by the data-provider system 124a/124b.

Referring to FIG. 2A, the data/model-processing system 120a may include a number of components. In some embodiments, the data/model-processing system 120a includes a data encryption/decryption component 202a, a homomorphic operation component 204a, and a data-evaluation component 206a. Each component may store or otherwise access data that is not available for storage and/or access by the other components. For example, the data encryption/decryption component 202a may store and/or access the private key $\kappa^-$; the homomorphic operation component 204a and/or the data-evaluation component 206a may not store and/or have access to the private key is $\kappa^-$. The components 202a, 204a, 206a may be referred to as containers, data silos, and/or sandboxes.

One or more of the components 202a, 204a, 206a may thus perform one or more of the steps 130-142 and/or 150-162 described above with reference to FIGS. 1A and 1B. The data encryption/decryption component 202a may, for example, generate the public/private key pair $\kappa^+/\kappa^-$, and may send the public key $\kappa^+$ to the model-provider system 122a and/or to the data-provider system 124a. The data encryption/decryption component 202a may further decrypt the encrypted difference data (using, for example, the private key $\kappa^-$) and may determine the sign data therefrom. The data-evaluation component 206a may receive, from the model-provider system 122a, the encrypted event data and may, based at least in part on the sign data, send the encrypted event data to the data-provider system 124a.

The homomorphic operation component 204a may receive, from the model-provider system 122a, the encrypted threshold data and may receive, from the data-provider system 124a, the encrypted input data. The homomorphic operation component 204a may further perform the homomorphic operation (as described in, for example, Equation (6)) to determine the sign data and may send, to the data-evaluation component 206a, the sign data.

Referring to FIG. 2B, with reference also to FIG. 1B, the data/model-processing system 120b may be trusted to store and/or access the event data. In these embodiments, a data encryption/decryption component 202b may thus include the event data 212. The data encryption/decryption component 202b may thus decrypt the encrypted event data to determine the event data 212 and may then send, to the data-provider system 124b, the event data. A homomorphic operation component 204b may perform one or more homomorphic operations, as described above with reference to the homomorphic operation component 204*a* of FIG. 2A.

Figure 4:
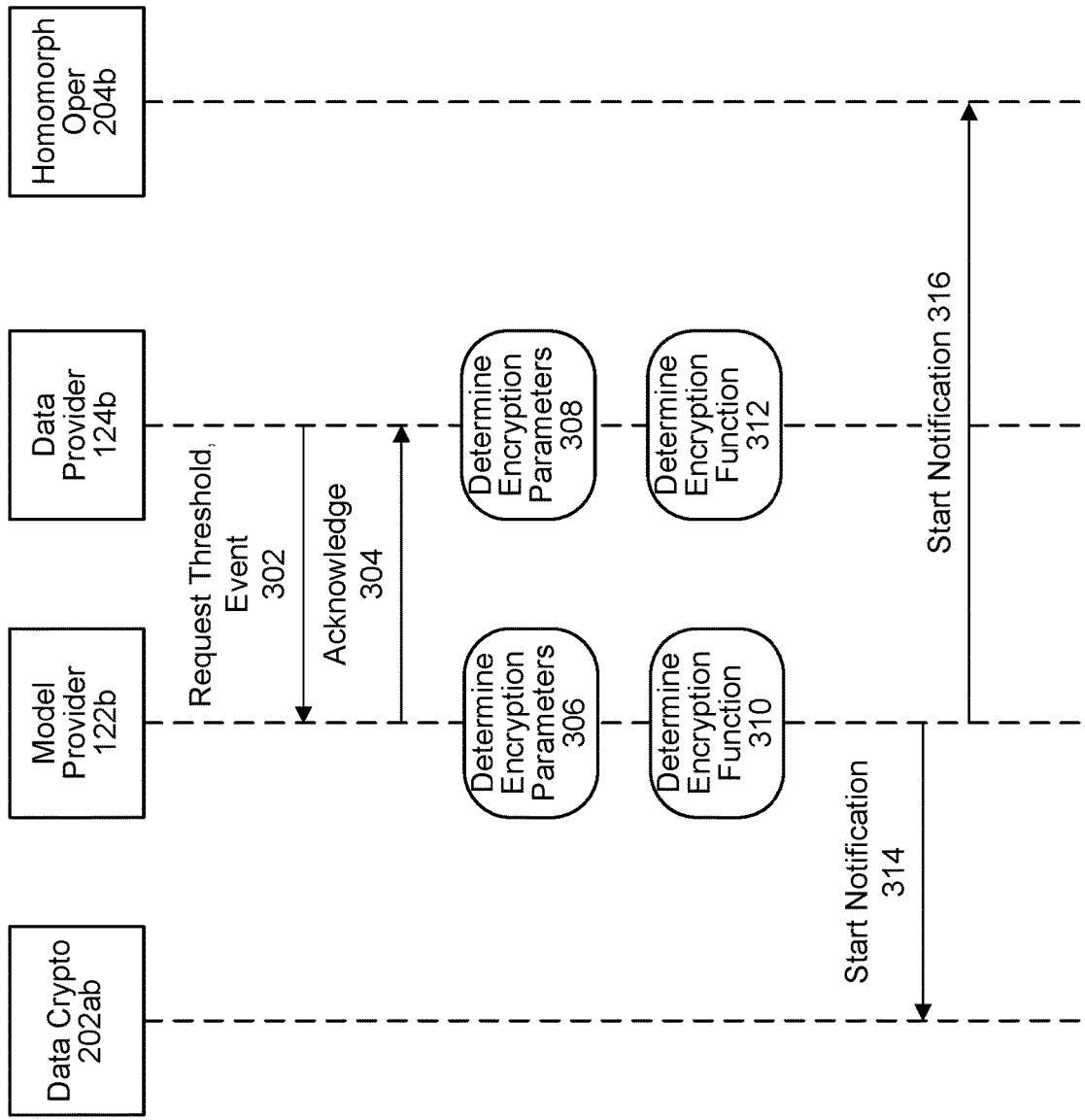

FIGS. 3 and 4 illustrate methods of initializing the data/model processing system 120*a*/120*b*, model-provider system 122*a*/122*b*, and/or data-provider system 124*a*/124*b*; one or more parts of these methods may be performed prior to performance of some or all of the methods described above with respect to FIGS. 1A and 1B.

Referring first to FIG. 3, the data-provider system 124*a* may send, to the model-provider system 122*a*, a request (302) to predict one or more events using one or more items of input data. This request may include an indication of the event. If, for example, the event corresponds to predicted failure of a component corresponding to the model-provider system 124*a*, the indication may include information identifying the component, such as a description of the component, a function of the component, and/or a serial and/or model number of the component. The indication may further include a desired time until failure of the component, such as one day, two days, one week, or other such duration of time.

The request may further include an indication of the threshold data that corresponds to the input data. The indication may include a description of the threshold data and/or a serial or other number referencing the threshold data. For example, if the input data is a voltage corresponding to a particular point in an electrical circuit of a component, the indication may include a description, name, and/or number identifying the point in the circuit.

In some embodiments, the model-provider system 122*a* may, upon receipt of the request, send a corresponding acknowledgement (304) indicating acceptance of the request. The acknowledgement may indicate that, when the model-provider system 122*a* receives input data corresponding to the threshold data, it is capable of predicting occurrence of the event (within, in some embodiments, the desired duration of time). In some embodiments, however, the model-provider system 122*a* may send, to the data-provider system, response data. This response data may include a request for further information identifying the component (such as additional description of the component and/or further information identifying the component, such as a make and/or model number). The data-provider system 124*a* may then send, in response to the request, the additional information, and the model-provider system 122*a* may then send the acknowledgement in response.

The response data may further include an indication of a period of time corresponding to the prediction of the event different from the period of time requested by the data-provider system 124*a*. For example, the data-provider system 124*a* may request that the prediction corresponds to a period of time approximately equal to two weeks before failure of the component. The model-provider system 122*a* may be incapable of making this prediction; the model-provider system 122*a* may therefore send, to the data-provider system 124*a*, an indication of a prediction that corresponds to a period of time approximately equal to one week before failure of the component. The data-provider system 124*a* may accept or reject this indication and may send further data to the model-provider system 122*a* indicating the acceptance or rejection; the model-provider system 122*a* may send the acknowledgement in response.

In some embodiments, as described above, the data-provider system 124*a* sends both the indication of the component for which the model-provider system 122*a* is to make the prediction of the event and the indication of the threshold data corresponding to the event. In some embodiments, the data-provider system 124*a* sends the indication of the component, and the model-provider system 122*a* determines the threshold data corresponding to the event. In other words, the data-provider system 124*a* may wish to predict an event corresponding to the component but may not determine the input data and/or threshold data used to predict the event. Upon determination of the input data and/or threshold data, the model-provider system 122*a* may send an indication of the input data and/or threshold data to the data-provider system 124*a*, when then may (as described above) later send corresponding input data.

As described herein, the data/model processing system 124*a* compares an item of threshold data to an item of input data to determine the predicted occurrence of the event. The present disclosure is not limited to a single comparison to predict the event, however, and any number of comparisons used to predict the event are within its scope. For example, the data/model processing system 124*a* may determine the predicted occurrence of the event based on a single item of input data, such as a voltage, crossing a threshold voltage. In other embodiments, however, the data/model processing system 124*a* may determine the predicted occurrence of the event after one or more items of input data cross one or more corresponding thresholds. For example, the data/model processing system 124*a* may determine the predicted occurrence of the event when a voltage crosses a first threshold and when a current crosses a second threshold. The data-provider system 124*a* may send, to the data/model processing system 124*a*, one or more items of encrypted input data corresponding to the voltage, current, etc., and the model-provider system 122*a* may send, to the data/model processing system 124*a*, one or more items of encrypted threshold data corresponding to the threshold voltage, threshold current, etc.

Similarly, the data/model processing system 124*a* may determine the prediction of occurrence of the event over a period of time. In various embodiments, the data/model processing system 124*a* determines that an item of input data crosses a corresponding threshold at a first point in time $t_1$ and that the item of input data crosses the threshold also at a second, later period of time $t_2$. The data/model processing system 124*a* may determine the predicted occurrence of the event only after the time $t_2$ and, in some embodiments, if the difference between the times $t_1$ and $t_2$ is less than a threshold amount of time. In other words, the data/model processing system 124*a* may determine the predicted occurrence of the event only if the item of input data exceeds the corresponding item of threshold data for at least the threshold amount of time.

The model-provider system 122*a* may determine (306) encryption parameters, and the data-provider system may similarly determine (308) the same or different encryption parameters. One of these encryption parameters may be the public key $\kappa^+$ described above, and may be received by each system from the data encryption/decryption component 202*a*.

In some embodiments, prior to encrypting and/or decrypting data using the public key $\kappa^+$, the model-provider system 122*a* and/or data-provider system 124*a* may modify the input data X and/or the threshold data $X_C$ in accordance with one or more values and/or functions. In various embodiments, the model-provider system 122*a* and/or data-provider system 124*a* modifies the input data X and/or the threshold data $X_C$ in accordance with the below equation (18).

$$\text{Modified Value}(X) = Rf(X) + P \quad (18)$$

In the above equation (6), R is a first value, P is a second value, and $f(X)$ is a function. R and P may be any values, such as any integer or floating-point number, and $f(X)$ may be any function. As described below, $f(X)$ may be a strictly increasing function, in which case R and P are large positive values; in other embodiments, $f(X)$ is a strictly decreasing function, and R and P are large negative values. One of the model-provider system 122a and/or data-provider system 124a may select values for R and P and may then transmit the values to the other of the model-provider system 122a and/or data-provider system 124a (after, in some embodiments, encrypting the values using, e.g., the public key $\kappa^+$). In other embodiments, the model-provider system 122a and/or data-provider system 124a may exchange the values for R and P using, for example, a Diffie-Hellman key-exchange protocol.

For example, the model-provider system 122a and data-provider system 124a may determine values for two prime numbers g and m, wherein g and m are co-prime numbers. One of the model-provider system 122a and/or data-provider system 124a may select the numbers and may transmit the numbers and/or encrypted versions of the numbers to the other of the model-provider system 122a and/or data-provider system 124a. One of the model-provider system 122a and/or data-provider system 124a may then select a first random number $r_1$ and compute the value of the expression of equation (19), below.

$$g^{r_1} \pmod{m} \qquad (19)$$

The other of the model-provider system 122a and/or data-provider system 124a may determine a select a second random number $r_2$ and compute the value of the expression of equation (20), below.

$$g^{r_2} \pmod{m} \qquad (20)$$

Each system may then transmit the results of the expression of equations (19) and (20) to the other. The system that determined and transmitted $r_1$ may then determine R in accordance with the below equation (21).

$$R = g^{r_2 \cdot r_1} \pmod{m} \qquad (22)$$

Similarly, the system that determined and transmitted r2 may also determine R in accordance with the below equation (23).

$$R = g^{r_1 \cdot r_2} \pmod{m} \qquad (23)$$

The model-provider system 122a and data-provider system 124a may similarly determine the value of P. The model-provider system 122a and data-provider system 124a may thus determine the values of R and P without transmitting R or P.

The model-provider system 122a and data-provider system 124a may similarly determine the encryption function $f(X)$. In various embodiments, one of the model-provider system 122a and data-provider system 124a determines (310) the function and transmits an indication of the function to the other of the model-provider system 122a and data-provider system 124a, which may then determine (312) the function based on the transmitted data. The indication may include a representation of the function and/or data representing the function, such as an index number. The function $f(X)$ may be a strictly increasing function for which the below relation expressed as equation (24) holds true.

$$X > X_C \text{ iff } f(X) > f(X_C) \qquad (24)$$

In the above equation (24), the notation "iff" represents the condition "if and only if." Examples of strictly increasing functions include $f(X) = X^m$, wherein m is any odd integer, or $f(X) = \text{sigmoid}(X)$. The model-provider system 122a may then send (314) a first start notification to the data/model processing system 120a to enable processing using the data encryption/decryption component 202, may send (316) a second start notification to the data/model processing system 120a to enable processing using the data evolution component 206a, and may send (318) a third start notification to the data/model processing system 120a to enable processing using the homomorphic operation component 204a. The data/model processing system 120a may enable processing of the components 202a, 204a, 206a by, for example, allocating memory space and/or processing resources for the components 202a, 204a, 206a.

Referring to FIG. 4, the data-provider system 124b and the model-provider system 122b may similarly send/receive the request (302) for the threshold data and/or event, the acknowledgement 304, determine encryption parameters 306, 308, and/or determine the encryption function 310, 312. As described above with reference to FIG. 1B, however, in some embodiments, the data encryption/decryption component 202b may be trusted to decrypt the event data. In these embodiments, the model-provider system sends a first start notification 314 to the data encryption/decryption component 202b and a second start notification 316 to the homomorphic operation component 204b. The model-provider system 122b may not send a start notification to a data evaluation component 206b.

Figure 5B:
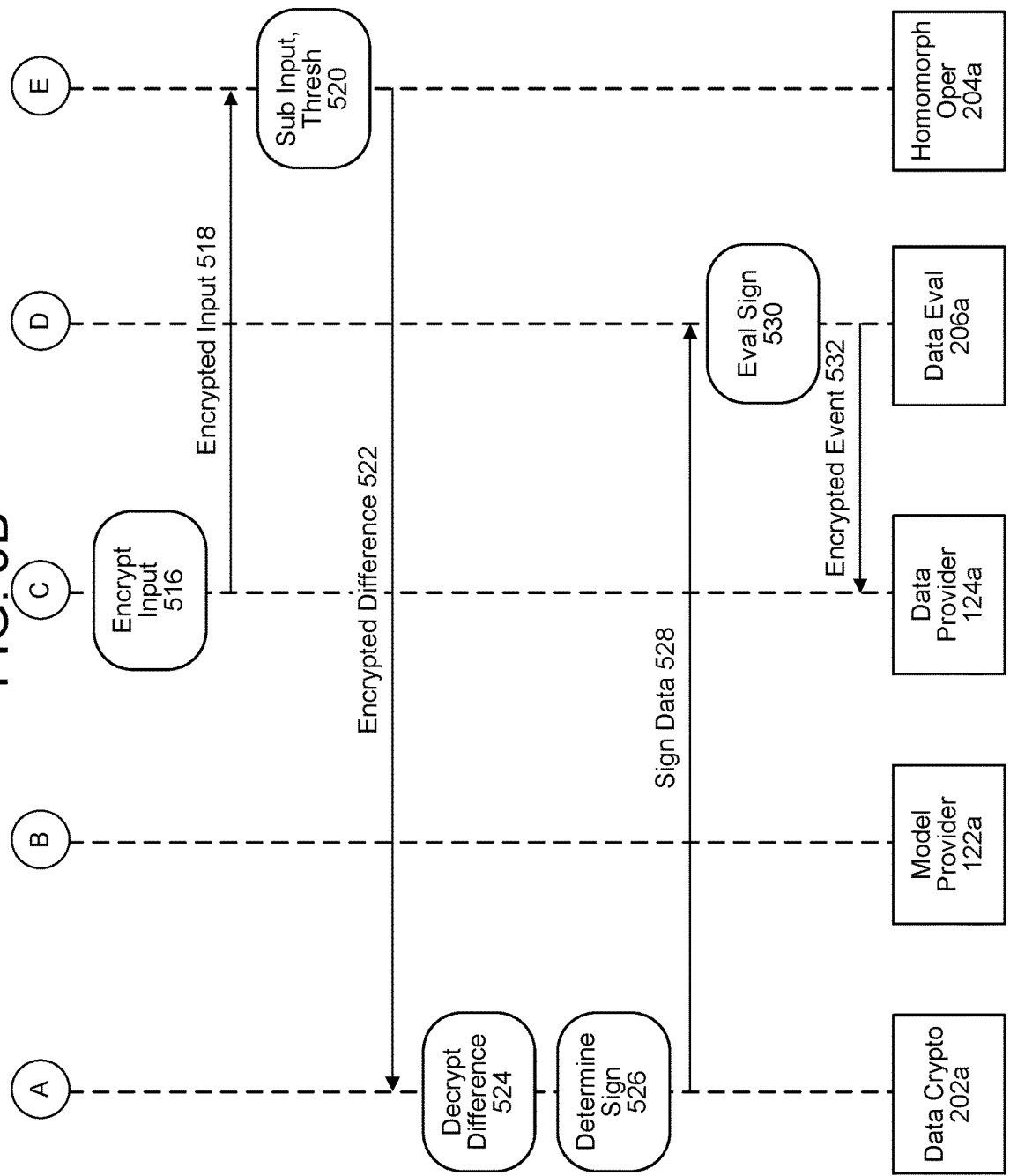

Referring to FIGS. 5A and 5B, as described herein, the data/model processing system 120a may send and receive data to and/or from the model-provider system 122a and the data-provider system 124a to predict one or more events based on the input data of the data-provider system 124a. In some embodiments, the data encryption/decryption component 202a, model-provider system 122a, data-provider system 124a, data evaluation component 206a, and/or homomorphic operation component 204a may re-determine (501) some or all of the encryption parameters and/or encryption function as described above with respect to steps 306, 308, 310, 312 of FIG. 3. This re-determination may occur prior to each performance of the rest of the steps described below with reference to FIGS. 5A and 5B, after some number of performances of the steps, and/or after a set period of time (e.g., one second, one minute, or one day) has elapsed. As described above, the data encryption/decryption component 202a may determine (502) a public/private key pair $\kappa^+/\kappa^-$, and may transmit (504) the public key $\kappa^+$ to the model-provider system 122a and may transmit (506) the public key $\kappa^+$ to the data-provider system 124a.

Using the public key $\kappa^+$ and/or the encryption parameter(s) and/or encryption function(s) of equation (7), the model-provider system 122a may encrypt (508) the event data and may transmit (510) the event data to the data evaluation component 206a. The model-provider system 122a may similarly encrypt (512) and transmit (514) the threshold data 514 to the homomorphic operation component 204a.

Referring to FIG. 5B, the data-provider component 214a may similarly encrypt (516), using the public key $\kappa^+$ and/or the encryption parameter(s) and/or encryption function(s) of equation (7), the input data, and may transmit the encrypted input data (518) to the homomorphic operation component 204a.

The homomorphic operation component 204a may then determine (520) a difference between (e.g., subtract) the encrypted input data and the encrypted threshold data. In various embodiments, the homomorphic operation component 204a determines the difference in accordance with equation (6) (e.g., by taking the inverse of one of the encrypted input data and the encrypted threshold data and multiplying the result with the other of the encrypted input data and the encrypted threshold data. The homomorphic operation component 204a may then transmit (522) the determined encrypted difference to the data encryption/decryption component 202a.

The data encryption/decryption component 202a may then decrypt (524) the encrypted difference data using, for example, the public key $\kappa^+$, and then may determine (526) sign data representing the sign of the result. For example, the data encryption/decryption component 202a may determine whether the result is a positive or negative number; if positive, the sign data may include a first value, and if negative, the sign data may include a second value.

The data encryption/decryption component 202a may then transmit (528) the sign data to the data-evaluation component 206a. The data-evaluation component 206a may evaluate (530) the sign (e.g., determine if it indicates a positive or negative number). If the sign data indicates that the input data is greater than the threshold data, the data-evaluation component 206a may then transmit (532), to the data-provider system 124a, the encrypted event data. If the sign data indicates that the input data is less than the threshold data, the data-evaluation component 206a may not transmit the encrypted event data. The data-provider system 124a may then decrypt, using the public key $\kappa^+$, the encrypted event data to determine event data representing the event.

Figure 6A:
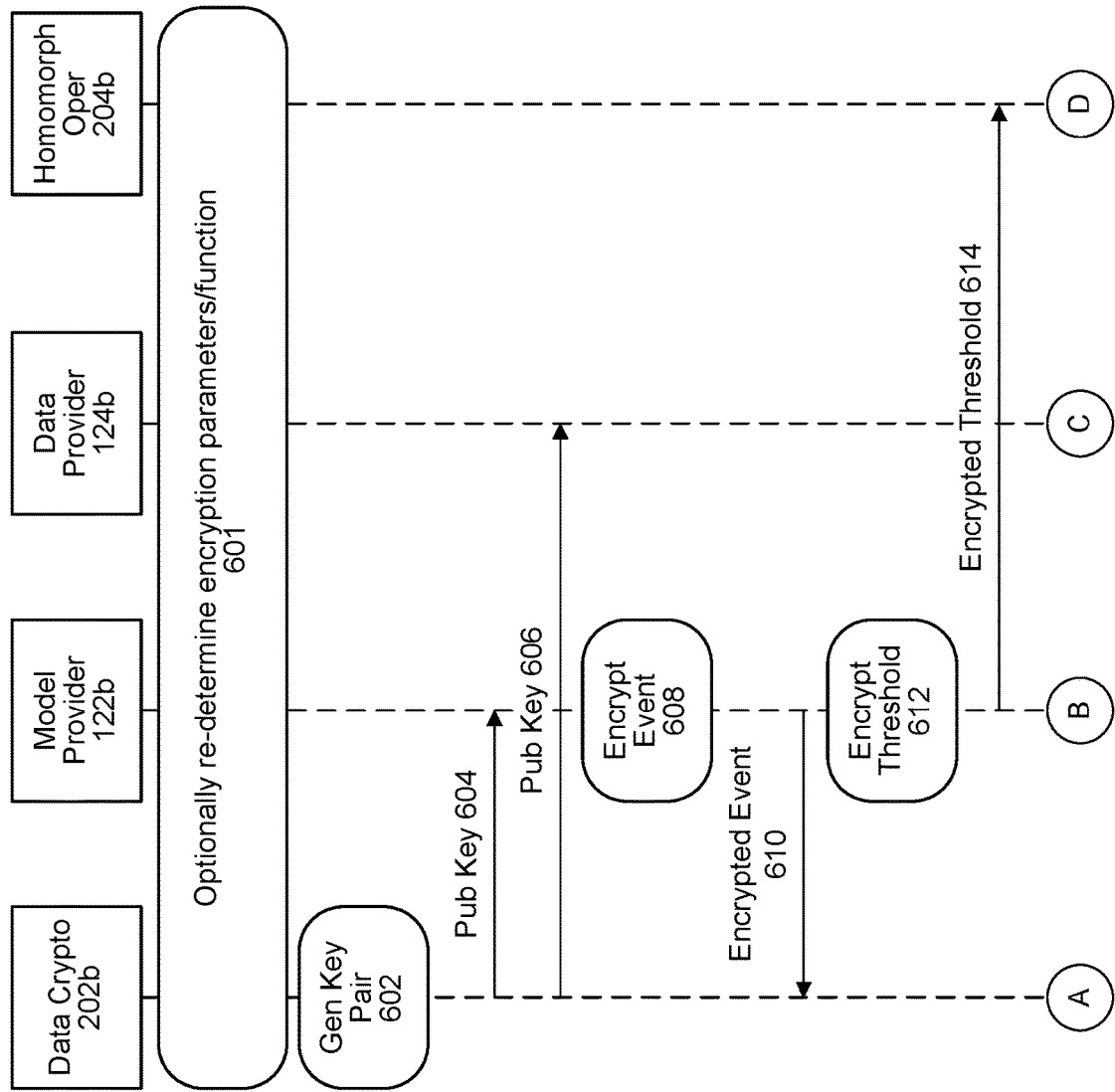

Referring to FIGS. 6A and 6B (with reference also to FIGS. 1B and 2B), in some embodiments, the data encryption/decryption component 202b, model-provider system 122b, data-provider system 124b, data, and/or homomorphic operation component 204b may re-determine (601) some or all of the encryption parameters and/or encryption function as described above with respect to steps 306, 308, 310, 312 of FIG. 4. This re-determination may occur prior to each performance of the rest of the steps described below with reference to FIGS. 5A and 5B, after some number of performances of the steps, and/or after a set period of time (e.g., one second, one minute, or one day) has elapsed. The data/model processing system 124b may further, in these embodiments, be trusted to store and/or access the unencrypted event data. In these embodiments, as also described above with reference to FIGS. 5A and 5B, the data encryption/decryption component may determine (602) the public/private key pair, and transmit (604, 606) the public key to the model-provider system 122b and the data-provider system 124.b The model-provider system 122b may encrypt (608) the event data and may encrypt (612) the threshold data; the model-provider system 122b may also transmit (610) the encrypted event data to the data encryption/decryption component 202b and may transmit (614) the encrypted threshold data to the homomorphic operation component 204b.

The data-provider system 124b may similarly encrypt (616) the input data and may also transmit (618) the encrypted event data to the homomorphic operation component 204b. The homomorphic operation component 204b may determine (620) a difference therebetween and may transmit (622) the encrypted difference to the data encryption/decryption component 202b. The data encryption/decryption component 202b may similarly decrypt (624) the encrypted difference data, determine (626) and evaluate the sign data (e.g., compare it to the threshold data). If the sign data indicates that the input data is greater than the threshold data, the data encryption/decryption component 202b may decrypt (628) the event data and transmit (630) the event data to the data-provider system 124b.

FIG. 7 is a block diagram illustrating a computing environment that includes a server 700; the server 700 may be the data/model processing system 120a/120b, model-provider system 122a/122b, and/or data-provider system 124a/124b. The server 700 may include one or more input/output device interfaces 702 and controllers/processors 704. The server 700 may further include storage 706 and a memory 708. A bus 710 may allow the input/output device interfaces 702, controllers/processors 704, storage 706, and memory 708 to communicate with each other; the components may instead or in addition be directly connected to each other or be connected via a different bus.

A variety of components may be connected through the input/output device interfaces 702. For example, the input/output device interfaces 702 may be used to connect to the network 170. Further components include keyboards, mice, displays, touchscreens, microphones, speakers, and any other type of user input/output device. The components may further include USB drives, removable hard drives, or any other type of removable storage.

The controllers/processors 704 may processes data and computer-readable instructions and may include a general-purpose central-processing unit, a specific-purpose processor such as a graphics processor, a digital-signal processor, an application-specific integrated circuit, a microcontroller, or any other type of controller or processor. The memory 708 may include volatile random access memory (RAM), non-volatile read only memory (ROM), non-volatile magnetoresistive (MRAM), and/or other types of memory. The storage 706 may be used for storing data and controller/processor-executable instructions on one or more non-volatile storage types, such as magnetic storage, optical storage, solid-state storage, etc.

Computer instructions for operating the server 700 and its various components may be executed by the controller(s)/processor(s) 704 using the memory 708 as temporary "working" storage at runtime. The computer instructions may be stored in a non-transitory manner in the memory 708, storage 706, and/or an external device(s). Alternatively, some or all of the executable instructions may be embedded in hardware or firmware on the respective device in addition to or instead of software.

Figure 8:
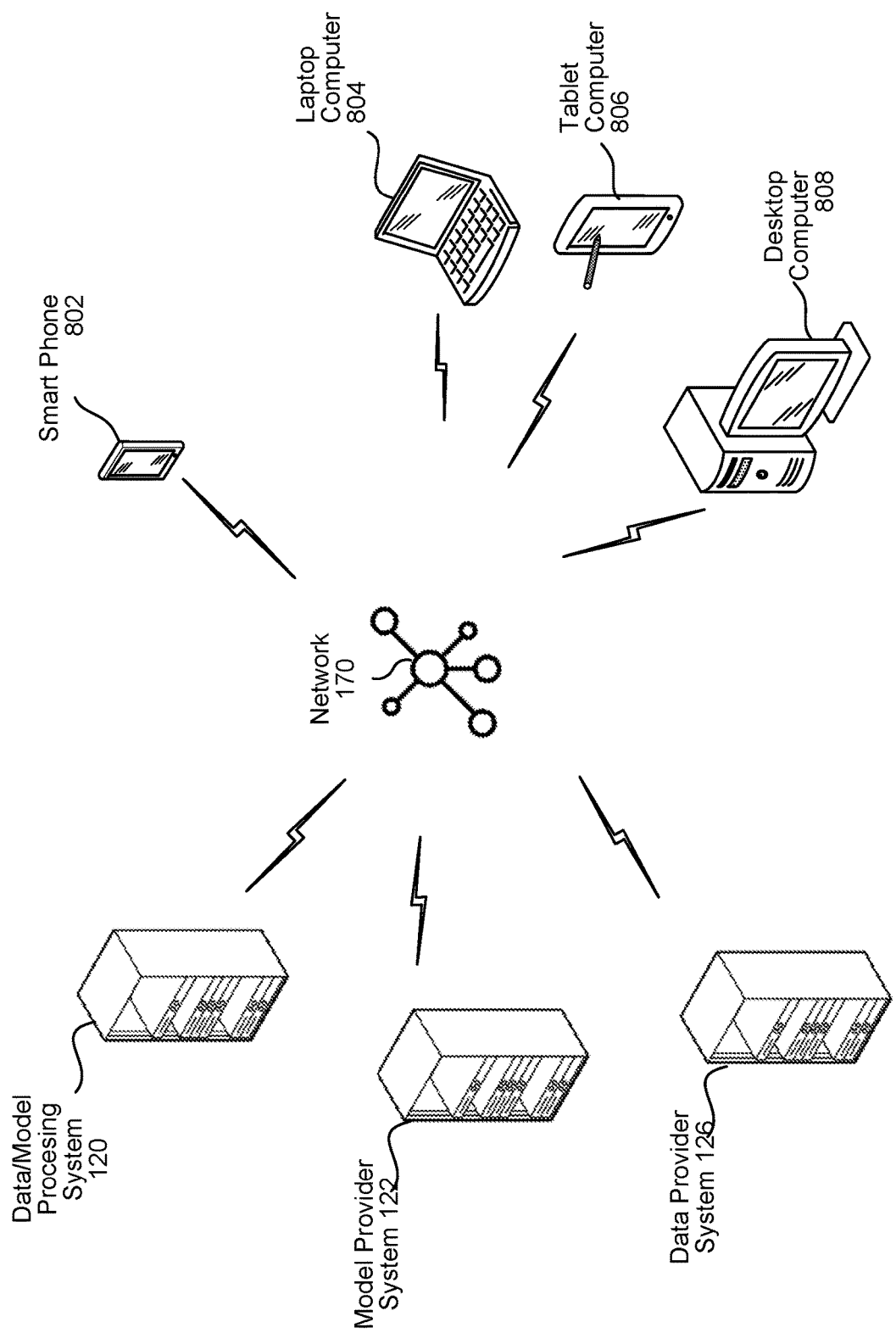
FIG. 8 is a conceptual diagram of a network according to embodiments of the present disclosure.

FIG. 8 illustrates a number of devices in communication with the data/model processing system 120a/120b, model-provider system 122a/122b, and/or data-provider system 124a/124b using the network 170a/170b. The devices may include a smart phone 802, a laptop computer 804, a tablet computer 806, and/or a desktop computer 808. These devices may be used to remotely access the data/model processing system 120a/120b, model-provider system 122a/122b, and/or data-provider system 124a/124b to perform any of the operations described herein.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and data processing should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of one or more of the modules and engines may be implemented as in firmware or hardware, which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
    sending, from a first system to a second system and from the first system to a third system, encryption key data;
    receiving, at the first system from the second system, encrypted event data, the encrypted event data corresponding to an event and being encrypted based at least in part on the encryption key data;
    receiving, at the first system from the second system, encrypted threshold data, the encrypted threshold data corresponding to a predicted occurrence of the event and being encrypted based at least in part on the encryption key data;
    receiving, at the first system from the third system, encrypted input data, the encrypted input data being encrypted based at least in part on the encryption key data;
    processing, using a computer processor and an additive homomorphic operation, the encrypted input data and the encrypted threshold data to determine encrypted difference data;
    determining that the encrypted difference data represents the predicted occurrence of the event; and
    sending, from the first system to the third system, the encrypted event data.

2. The computer-implemented method of claim 1, further comprising:
    prior to sending the encryption key data, determining, by the second system, a first encryption parameter; and
    determining, by the third system, the first encryption parameter,
    wherein the encrypted event data is based at least in part on the first encryption parameter and wherein the encrypted input data is based at least in part on the first encryption parameter.

3. The computer-implemented method of claim 1, further comprising:
    prior to sending the encryption key data, determining, by the second system, a first encryption function; and
    sending, from the second system to the third system, an indication of the first encryption function,
    wherein the encrypted event data is based at least in part on the first encryption function and wherein the encrypted input data is based at least in part on the first encryption function.

4. The computer-implemented method of claim 1, wherein the event corresponds to failure of a component corresponding to the third system and wherein the encrypted input data corresponds to operational data corresponding to the component.

5. The computer-implemented method of claim 1, wherein determining the encrypted difference data comprises multiplying the encrypted input data and the encrypted threshold data, wherein the encrypted input data represents first homomorphic encryption data and the encrypted threshold data represents second homomorphic encryption data.

6. The computer-implemented method of claim 1, wherein determining that the encrypted difference data represents the predicted occurrence of the event comprises:
    determining sign data corresponding to the encrypted difference data, the sign data representing a positive sign or a negative sign; and
    processing decision-tree data based at least in part on the sign data.

7. The computer-implemented method of claim 1, further comprising:
    receiving, by the third system, the encrypted event data; and
    processing, by the third system, the encrypted event data to determine event data corresponding to the predicted occurrence of the event.

8. The computer-implemented method of claim 1, further comprising:
    receiving, by the second system, second encrypted input data;
    processing, using a trained model of the second system, the second encrypted input data to determine threshold data; and
    encrypting the threshold data to determine the encrypted threshold data.

9. The computer-implemented method of claim 1, further comprising:

sending, from a first component of the first system to a second component of the first system, the encrypted difference data, wherein determining the encrypted difference data corresponds to the first component and wherein determining that the encrypted difference data represents the predicted occurrence corresponds to the second component.

10. The computer-implemented method of claim 1, wherein the encryption key data corresponds to elliptic-curve cryptography, further comprising:

determining, by a first component of the first system, public key data and corresponding private key data, wherein the encryption key data corresponds to the public key data.

11. A system comprising:

at least one processor; and at least one memory including instructions that, when executed by the at least one processor, cause the system to:

send, from a first system to a second system and from the first system to a third system, encryption key data;

receive, at the first system from the second system, encrypted event data, the encrypted event data corresponding to an event and being encrypted based at least in part on the encryption key data;

receive, at the first system from the second system, encrypted threshold data, the encrypted threshold data corresponding to a predicted occurrence of the event and being encrypted based at least in part on the encryption key data;

receive, at the first system from the third system, encrypted input data, the encrypted input data being encrypted based at least in part on the encryption key data;

process, using the at least one processor and an additive homomorphic operation, the encrypted input data and the encrypted threshold data to determine encrypted difference data;

determine that the encrypted difference data represents the predicted occurrence of the event; and send, from the first system to the third system, the encrypted event data.

12. The system of claim 11, wherein the at least one memory further includes instructions, that, when executed by the at least one processor, further cause the system to:

prior to sending the encryption key data, determine, by the second system, a first encryption parameter; and determine, by the third system, the first encryption parameter, wherein the encrypted event data is based at least in part on the first encryption parameter and wherein the encrypted input data is based at least in part on the first encryption parameter.

13. The system of claim 11, wherein the at least one memory further includes instructions, that, when executed by the at least one processor, further cause the system to:

prior to sending the encryption key data, determine, by the second system, a first encryption function; and send, from the second system to the third system, an indication of the first encryption function, wherein the encrypted event data is based at least in part on the first encryption function and wherein the encrypted input data is based at least in part on the first encryption function.

14. The system of claim 11, wherein the event corresponds to failure of a component corresponding to the third system and wherein the encrypted input data corresponds to operational data corresponding to the component.

15. The system of claim 11, wherein the instructions for determining the encrypted difference data further comprise instructions for multiplying the encrypted input data and the encrypted threshold data, wherein the encrypted input data represents first homomorphic encryption data and the encrypted threshold data represents second homomorphic encryption data.

16. The system of claim 11, wherein the at least one memory further includes instructions for determining that the encrypted difference data represents the predicted occurrence of the event, that, when executed by the at least one processor, further cause the system to:

determine sign data corresponding to the encrypted difference data the sign data representing a positive sign or a negative sign; and process decision-tree data based at least in part on the sign data.

17. The system of claim 11, wherein the at least one memory further includes instructions, that, when executed by the at least one processor, further cause the system to:

receive, by the third system, the encrypted event data; and process, by the third system, the encrypted event data to determine event data corresponding to the predicted occurrence of the event.

18. The system of claim 11, wherein the at least one memory further includes instructions, that, when executed by the at least one processor, further cause the system to:

receive, by the second system, second encrypted input data;

process, using a trained model of the second system, the second encrypted input data to determine threshold data; and encrypt the threshold data to determine the encrypted threshold data.

19. The system of claim 11, wherein the at least one memory further includes instructions, that, when executed by the at least one processor, further cause the system to:

send, from a first component of the first system to a second component of the first system, the encrypted difference data, wherein determining the encrypted difference data corresponds to the first component and wherein determining that the encrypted difference data represents the predicted occurrence corresponds to the second component.

20. A computer-implemented method comprising:

sending, from a first system to a second system and from the first system to a third system, encryption key data;

receiving, at the first system from the second system, encrypted event data, the encrypted event data corresponding to an event and being encrypted based at least in part on the encryption key data;

receiving, at the first system from the second system, encrypted threshold data, the encrypted threshold data corresponding to a predicted occurrence of the event and being encrypted based at least in part on the encryption key data;

receiving, at the first system from the third system, encrypted input data, the encrypted input data being encrypted based at least in part on the encryption key data;

processing, using a computer processor and an additive homomorphic operation, the encrypted input data and the encrypted threshold data to determine encrypted difference data;

determining that the encrypted difference data represents the predicted occurrence of the event;

decrypting the encrypted event data to determine event data; and sending, from the first system to the third system, the event data.

\* \* \* \* \*